(12) United States Patent
Colonna et al.

(10) Patent No.: US 9,985,729 B2
(45) Date of Patent: May 29, 2018

(54) MANAGEMENT OF FRAME PRIORITIES IN FIBRE CHANNEL

(71) Applicant: International Business Machines Corporation, Armonk, NY (US)

(72) Inventors: Christopher J. Colonna, Ossining, NY (US); Patricia G. Driever, Poughkeepsie, NY (US); John R. Flanagan, Poughkeepsie, NY (US); Roger G. Hathorn, Tucson, AZ (US); William H. Miller, Newburgh, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 15/051,453

(22) Filed: Feb. 23, 2016

(65) Prior Publication Data

US 2017/0244485 A1   Aug. 24, 2017

(51) Int. Cl.
*H04B 10/25* (2013.01)
*H04Q 11/00* (2006.01)

(52) U.S. Cl.
CPC ......... *H04B 10/25* (2013.01); *H04Q 11/0001* (2013.01)

(58) Field of Classification Search
CPC ....... H04Q 11/0005; H04Q 2011/0039; H04Q 11/0062; H04Q 2011/0052; H04Q 2011/0015; H04Q 11/0111; H04B 10/25
See application file for complete search history.

(56) References Cited

U.S. PATENT DOCUMENTS

| 9,547,598 | B1* | 1/2017 | Karnowski | G06F 12/0833 |
| 2003/0056000 | A1 | 3/2003 | Mullendore et al. | |
| 2005/0281196 | A1* | 12/2005 | Tornetta | H04L 45/00 370/235 |
| 2015/0381529 | A1 | 12/2015 | Hathorn et al. | |
| 2015/0381530 | A1 | 12/2015 | Hathorn et al. | |
| 2015/0381726 | A1 | 12/2015 | Hathorn et al. | |

FOREIGN PATENT DOCUMENTS

| CN | 1329446 A | 1/2002 |
| CN | 101068250 A | 11/2007 |

OTHER PUBLICATIONS

R. Saket, et al., "Frame Packing Algorithms for Automotive Applications", HAL Id: inria-00077036, https://hal.inria.fr/inria-00077036, May 29, 2006, pp. 29.

(Continued)

*Primary Examiner* — Ted Wang
(74) *Attorney, Agent, or Firm* — Rabindranath Dutta; Konrad Raynes Davda & Victor LLP

(57) ABSTRACT

A first device transmits a first Fiber Channel frame with a first priority to a second device. The first device receives a second Fiber Channel frame from the second device, where the second Fiber Channel frame has a second priority indicated by the second device. The first device determines whether to adopt the second priority indicated by the second device or whether to continue to use the first priority for transmitting subsequent Fiber Channel frames to the second device.

18 Claims, 11 Drawing Sheets

(56) References Cited

OTHER PUBLICATIONS

English translation of Chinese patent CN1329446 dated Jan. 2, 2002 Yu et al.
English translation of Chinese patent CN101068250 dated Nov. 7, 2007 Liu et al.
"Fibre Channel Single-Byte Command Code Sets Mapping Protocol—5 (FC-SB-5)", Rev. 2.00, Mar. 26, 2013, INCITS Working Draft proposed American National Standard for Information Technology, pp. 269.
"Fibre Channel Link Services (FC-LS-3)", Rev. 3.10, Feb. 1, 2014, INCITS Working Draft proposed American National Standard for Information Technology, pp. 207.
"Fibre Channel Framing and Signaling—4 (FC-FS-4)", Rev. 0.50, May 16, 2014, INCITS Working Draft proposed American National Standard for Information Technology, pp. 448.

\* cited by examiner

500 — Rules for "ships passing" conditions in FC-SB-5

502

8.2.2 Rules for Device-level Functions in Command Mode
...
f) If a channel sends an initiation IU containing a device-level control function or a command to a device on a logical path and simultaneously a control unit sends an initiation IU as information category unsolicited data containing status for the same device on the same logical path, then the control unit shall send a response to the initiation IU using the existing inbound exchange with an IU which contains the same token (see 8.5.5). as the initiation IU from the channel. The channel shall discard the initiation IU from the control unit and shall wait for another IU on the inbound exchange from the same device which contains a response to its initiation IU.

504

8.2.3 Rules for Device-level Functions in Transport Mode
...
e) If a channel sends a transport-command IU to a device on a logical path and simultaneously a control unit sends an initiation IU as information category unsolicited data containing status on another exchange
for the same device on the same logical path, then the following actions shall be performed in the order listed by the channel and control unit:
A) The channel shall respond to the initiation IU from the control unit with a stack status control IU on a new outbound exchange;
B) If the transport-command IU is for a write operation and first-transfer-ready is disabled, the channel shall send a transport-data IU to the control unit;
C) At this point, sequence initiative for the transport exchange is held by control unit and the channel waits for an IU from the CU sent in response to the command IU; and
D) The control unit shall respond to the stack status control IU with a DACK control IU on the existing inbound exchange and then shall either perform the transport operation specified by the transport-command IU from the channel or presents the stacked status with busy status in the transport-response IU on the transport exchange.

FIG. 5

MANAGEMENT OF FRAME PRIORITIES IN FIBRE CHANNEL

BACKGROUND

1. Field

Embodiments relate to the management of frame priorities in Fibre Channel.

2. Background

Fibre Channel is a switched communications protocol that allows communication among computing devices. Fibre Channel may be considered to be a channel and network hybrid, containing enough network features to provide the needed connectivity, distance and protocol multiplexing, and enough channel features to retain simplicity, repeatable performance and reliable delivery. Fibre Channel is capable of transmission of frames at rates extending from 1 Gbps (gigabits per second) to 32 Gbps or more. It is also able to transport commands and data according to existing protocols and/or formats such as Internet protocol (IP), Small Computer System Interface (SCSI), High Performance Parallel Interface (HIPPI) and Intelligent Peripheral Interface (IPI), Fibre Connection (FICON), count key data (CKD), enhanced CKD (ECKD), etc.

In certain situations, Fibre Channel is used to connect one or more devices, where the devices may include computing and storage devices. In the terminology of Fibre Channel, each of these devices is considered a node. One node may be connected directly to another, or may be interconnected, such as, via a Fibre Channel fabric. The fabric may be a single Fibre Channel switch, or a group of switches acting together. Multiple Fibre Channel switches may be combined into a single fabric.

Fibre Channel data is formatted into variable length frames. Each frame may include a header and a data payload field. The integrated set of architectural standards that describe the formatting of Fibre Channel frames, data transfer mechanisms, and other aspects of the Fibre Channel architecture are being developed by the American National Standards Institute (ANSI).

"Fibre Channel Framing and Signaling-4 (FC-FS-4)", Rev. 0.50, published May 16, 2014 is a working draft proposed by ANSI, and describes the framing and signaling requirements for Fibre Channel links. "Fibre Channel Link Services (FC-LS-3)", Rev. 3.10, published Feb. 1, 2014 is a working draft proposed by ANSI, and describes the link services requirements for Fibre Channel.

FICON (Fibre Connection) is a Fibre Channel Protocol and may also be referred to by the formal names of FC-SB-3, FC-SB-4, or FC-SB-5. The protocol and functions specified by FC-SB-3 continues to be supported in FC-SB-4 and FC-SB-5, and further details of FC-SB-5 may be found in the publication, "FIBRE CHANNEL Single-Byte Command Code Sets Mapping Protocol-5 (FC-SB-5)", Rev. 2.0, published Mar. 26, 2013 by ANSI.

FICON is a Fibre Channel layer 4 protocol used to map certain types of channel to control unit cabling infrastructure and protocol onto standard Fibre Channel services and infrastructure, where a channel is a direct or a switched point-to-point connection between communicating devices. FICON uses two Fibre Channel exchanges for a channel to control unit connection—one for each direction. So while a Fibre Channel exchange is capable of carrying a command and response on a single exchange, the response to a FICON information unit (IU) is always on a different exchange from the IU to which it is a response. The two exchanges that implement a connection are called an exchange pair.

A storage controller is computational devices that controls access to one or more storage devices. Host computing systems may access data stored in the storage devices via the storage controller that may be coupled to the host via a Fabric. Thus the storage controller and hosts may operate in a Fibre Channel environment and may be coupled via a Fabric.

Priority of frames may be maintained within the same exchange, in computing environments that use the Fibre Channel Protocol. For example, a host may send a Fibre channel frame to a fabric and indicate a priority for the Fibre Channel frame in a priority field in the header of the Fibre Channel frame. The fabric which supports priority indications for Fibre Channel frames may forward the Fibre Channel frame to a storage controller. As a result, the storage controller receives the priority indicated by the host.

While responding to the host via the fabric, the storage controller may respond with frames that have the same priority indicated originally by the host. As a result, the host receives the response of the storage controller with the same priority as the priority indicated by the host.

SUMMARY OF THE PREFERRED EMBODIMENTS

Provided are a method, a system, and a computer program in which a first device transmits a first Fibre Channel frame with a first priority to a second device. The first device receives a second Fibre Channel frame from the second device, where the second Fibre Channel frame has a second priority indicated by the second device. The first device determines whether to adopt the second priority indicated by the second device or whether to continue to use the first priority for transmitting subsequent Fibre Channel frames to the second device.

In additional embodiments, if the first Fibre Channel frame indicates an asynchronous status then the first device continues to use the first priority for transmitting the subsequent Fibre Channel frames to the second device.

In further embodiments, if the first Fibre Channel frame indicates a reconnect status then the first device adopts the second priority indicated by the second device for transmitting the subsequent Fibre Channel frames to the second device.

In certain embodiments, the first device is a control unit, and the second device is a channel. The control unit sends a command mode status which opens an inbound exchange with the first priority set in frames of an Information Unit (IU). In response to receiving a command mode IU that opens an outbound exchange with a synchronize response (SYR) bit set, wherein the outbound exchange has the second priority set in the frames of the IU, the control unit uses the second priority in frames of subsequent IUs of the inbound exchange.

In additional embodiments, the SYR bit is set by the channel to indicate a direct response to the command mode status.

In certain embodiments, the first device is a control unit, and the second device is a channel. The control unit sends a command mode status which opens an inbound exchange with the first priority set in frames of an Information Unit (IU). In response to receiving a command mode IU that opens an outbound exchange with a SYR bit not set, wherein the outbound exchange has the second priority set in the frames of the IU, the control unit continues to use the first priority in frames of subsequent IUs of the inbound exchange.

In additional embodiments, the first device is a storage controller that controls a plurality of storage devices; the second device is a host; a fabric comprising one or more Fibre Channel switches couples the first device to the second device; and priority is indicated by programming a CS_CTL/Priority field in a frame header corresponding to Fibre Channel frames.

BRIEF DESCRIPTION OF THE DRAWINGS

Referring now to the drawings in which like reference numbers represent corresponding parts throughout:

FIG. 5 illustrates a rules for device-level functions in command mode and transport mode in Fibre Channel, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Fibre channel input/output (I/O) operations may have priority assigned to them by a workload managing entity. A priority value is included in all Fibre Channel frames associated with an I/O operation. For FICON (FC-SB-5) I/O operations, there are situations in which a channel may initiate a new I/O operation at the same time a control unit is initiating an exchange to the channel to present an asynchronous status. This is referred to as "ships passing". It is desirable to maintain proper priority in subsequent frames of the exchanges to maintain order of the frames received by the channel as the ships passing scenario is resolved, based on the type of status being presented by the control unit and the rules of the Fibre Channel standards for resolving the condition.

In certain situations, the system operating system may change priority between operations. This may lead to starts using different priorities. Some operations may cause a disconnection and reconnection to occur during status presentation. Sometimes a command is sent asynchronously from the channel for a new start, and sometimes a command is sent in response to asynchronous status received from the control unit. Some ships passing cases may lead to the control unit using one priority for the status presentation and another priority for subsequent frames on the same exchange. Under congested fabric conditions, this may lead to the fabric delivering frames to the channel in an order that is different from the order the frames were transmitted by the control unit (based on the indicated priority).

Certain embodiments provide mechanisms that assure that the same priority is used through the life of an exchange, at least for the cases in which there are multiple inbound sequences that the channel may not yet have received. A set of rules are established to ensure constant priority with frames of an exchange when ships passing conditions occur, to ensure ordered delivery of frames in an exchange.

Exemplary Embodiments

Figure 1:
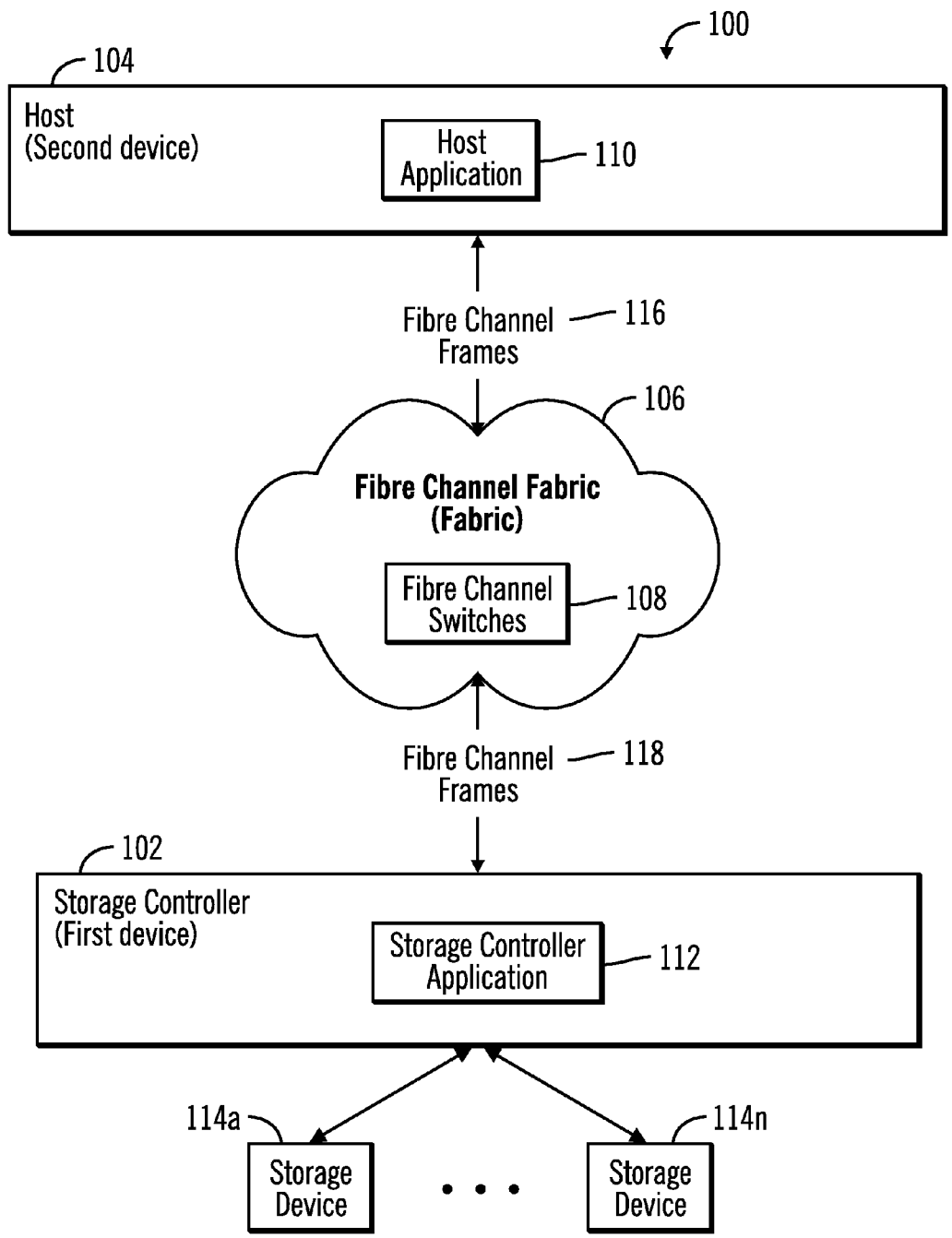
FIG. 1 illustrates a block diagram of a computing environment comprising a storage controller coupled to a host via a fabric, in accordance with certain embodiments.

FIG. 1 illustrates a block diagram of a computing environment 100 comprising a storage controller 102 coupled to a host 104 via a Fibre Channel fabric 106, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a Fibre Channel fabric 106, where the Fibre Channel fabric 106 is also referred to as a fabric. The fabric 106 is comprised of one or more Fibre Channel switches 108. A host application 110 executes in the host 104 and a storage controller application 112 executes in the storage controller 102, where the host application 110 and the storage controller application 112 may be implemented in software, hardware, firmware or any combination thereof.

The storage controller 102 controls access to one or more storage devices 114a . . . 114n that are coupled to the storage controller. While not shown in FIG. 1, in alternative embodiments, the coupling of the storage devices 114a . . . 114n to the storage controller 102 may also be via the fabric 106.

In certain embodiments, in accordance with the Fibre Channel Protocol, the host 104, the fabric 106, and the storage controller 102 may transmit or receive Fibre Channel frames 116, 118 among themselves as shown in FIG. 1.

In certain embodiments, the host 104 indicates a priority in Fibre Channel frames on commands intended for the storage controller 102 that are sent via the fabric 106. The storage controller 102 determines based on certain conditions whether to respond to the command from the host 104 by sending Fibre Channel frames via the Fabric 106 by adopting the priority indicated by the host 104, or whether to continue to use a priority that was being previously used by the storage controller 102 for transmitting Fibre Channel frames in an exchange to the host 104.

Figure 2:
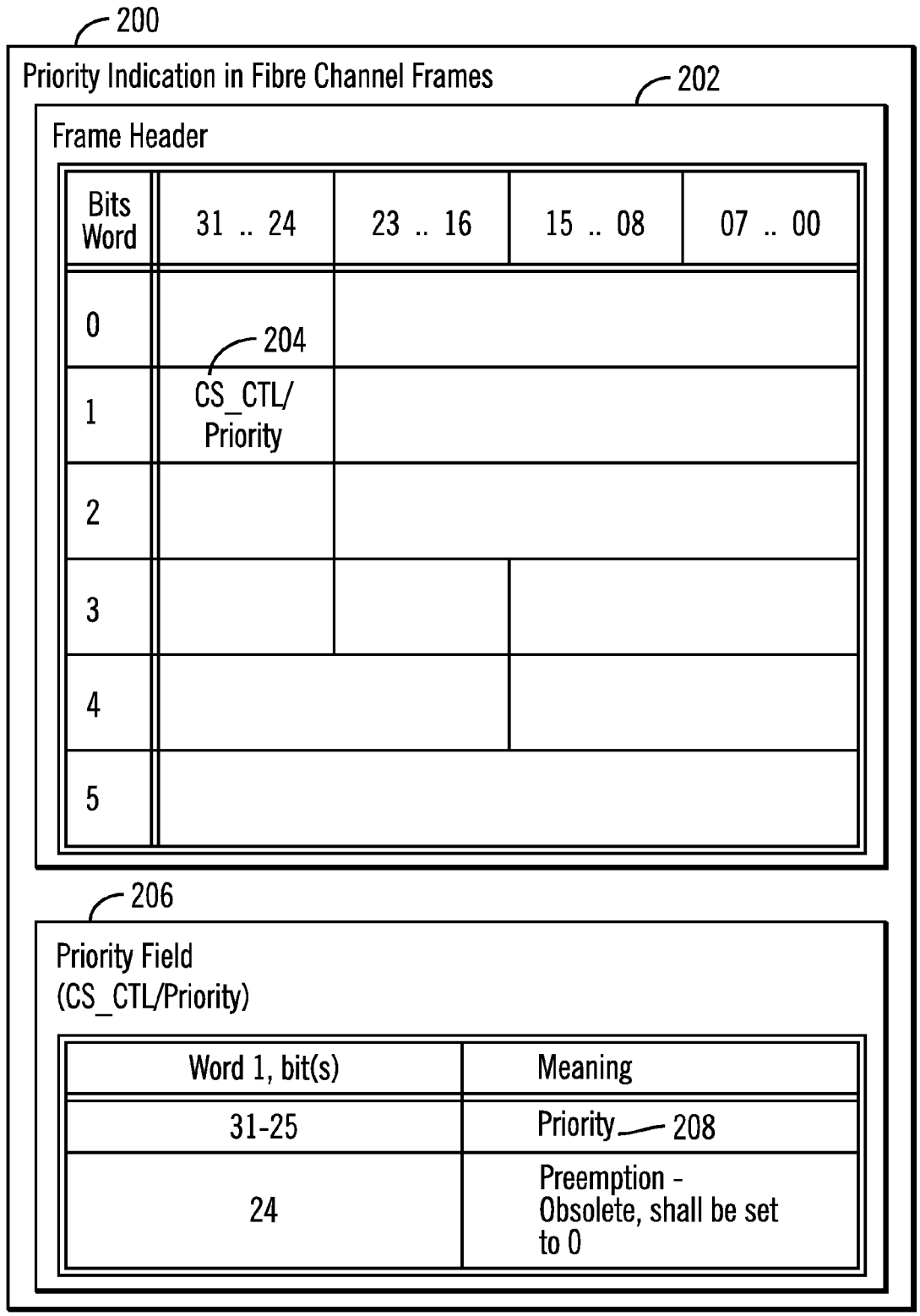
FIG. 2 illustrates a block diagram that how priority is indicated in a Fibre Channel frame, in accordance with certain embodiments.

FIG. 2 illustrates a block diagram 200 that how priority is indicated in a Fibre Channel frame, in accordance with certain embodiments.

FC-FS-4 provides a mechanism to indicate a priority in the header 202 of a Fibre Channel frame. The CS_CTL/Priority field 204 is used to indicate the priority of the Fibre Channel frame. In an exemplary CS_CTL/Priority field 206 bits 25-31 indicate the priority as shown via reference numeral 208. A value of 0000000b bits 31-25 indicates that no Priority has been assigned to the frame. The remaining values indicates, in ascending order, the relative priority of the frame (e.g., a Priority of 23 h is considered to have a lower priority than a Priority of 57 h). Higher priority frames (i.e., frames with a higher indicated priority) receive preferential treatment for processing, resources, transmission, etc. in comparison to lower priority frames (i.e., frames with a lower indicated priority).

Certain embodiments use Fiber Channel storage area network (SAN) architecture to provide mechanisms for a host application or operating system to specify a fabric priority to be used to manage input/output (I/O) requests through the SAN. The Fibre Channel standards allow for specification of an operation priority in each frame sent for the operation. Fibre channel switches 108 may use this information to provide a guaranteed (or a higher quality of service) for higher priority operations.

Figure 3:
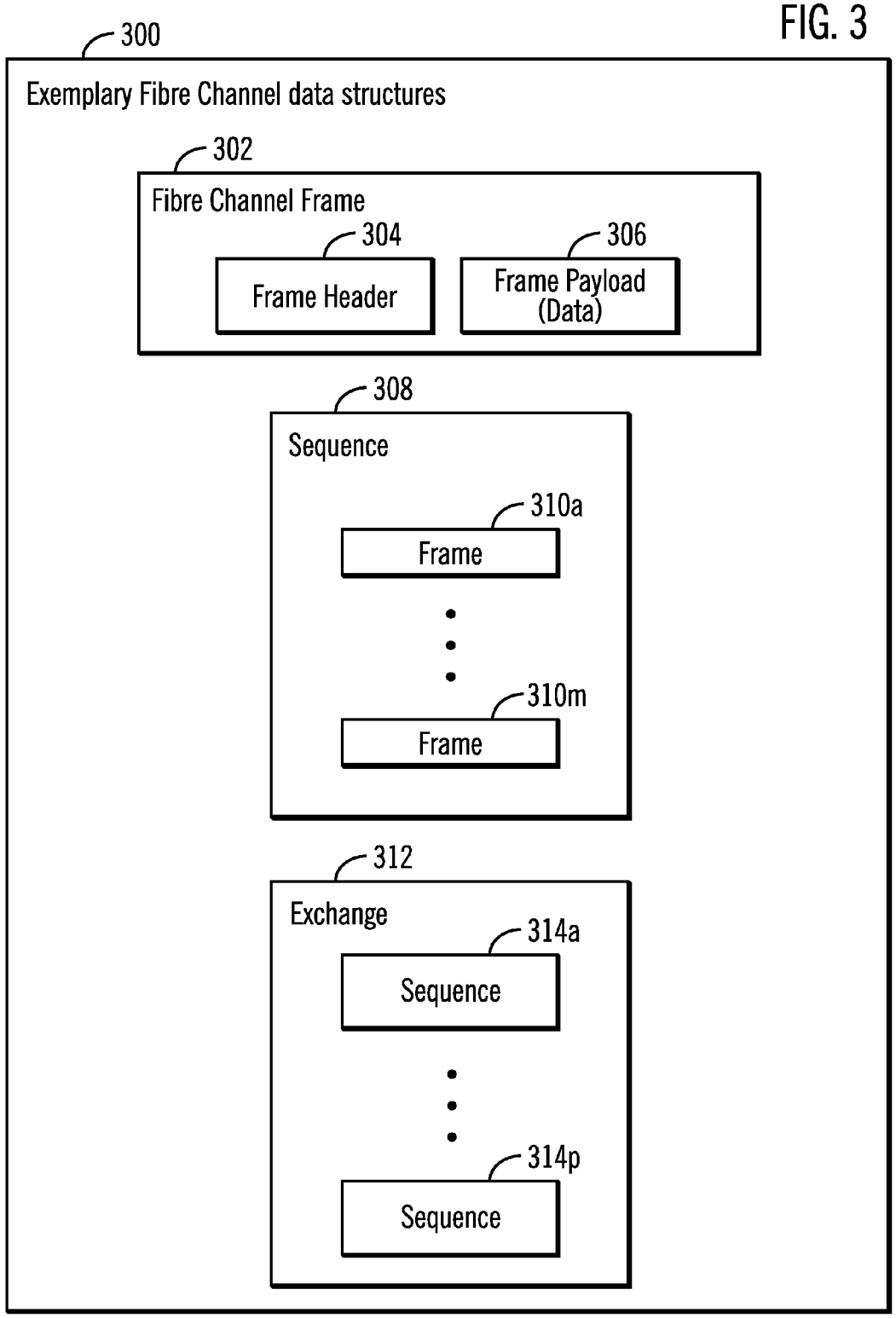
FIG. 3 illustrates a block diagram that shows exemplary Fibre Channel data structures, in accordance with certain embodiments.

FIG. 3 illustrates a block diagram that shows exemplary Fibre Channel data structures 300, in accordance with certain embodiments. A Fibre Channel frame 302 is comprised of a frame header 304 and a frame payload 306, where the frame header 304 may include control information and the frame payload 306 may include data. A sequence 308 is comprised of one or more frames 310a ... 310m, and an exchange 312 is comprised of a plurality of sequences 314a ... 314p.

Figure 4:
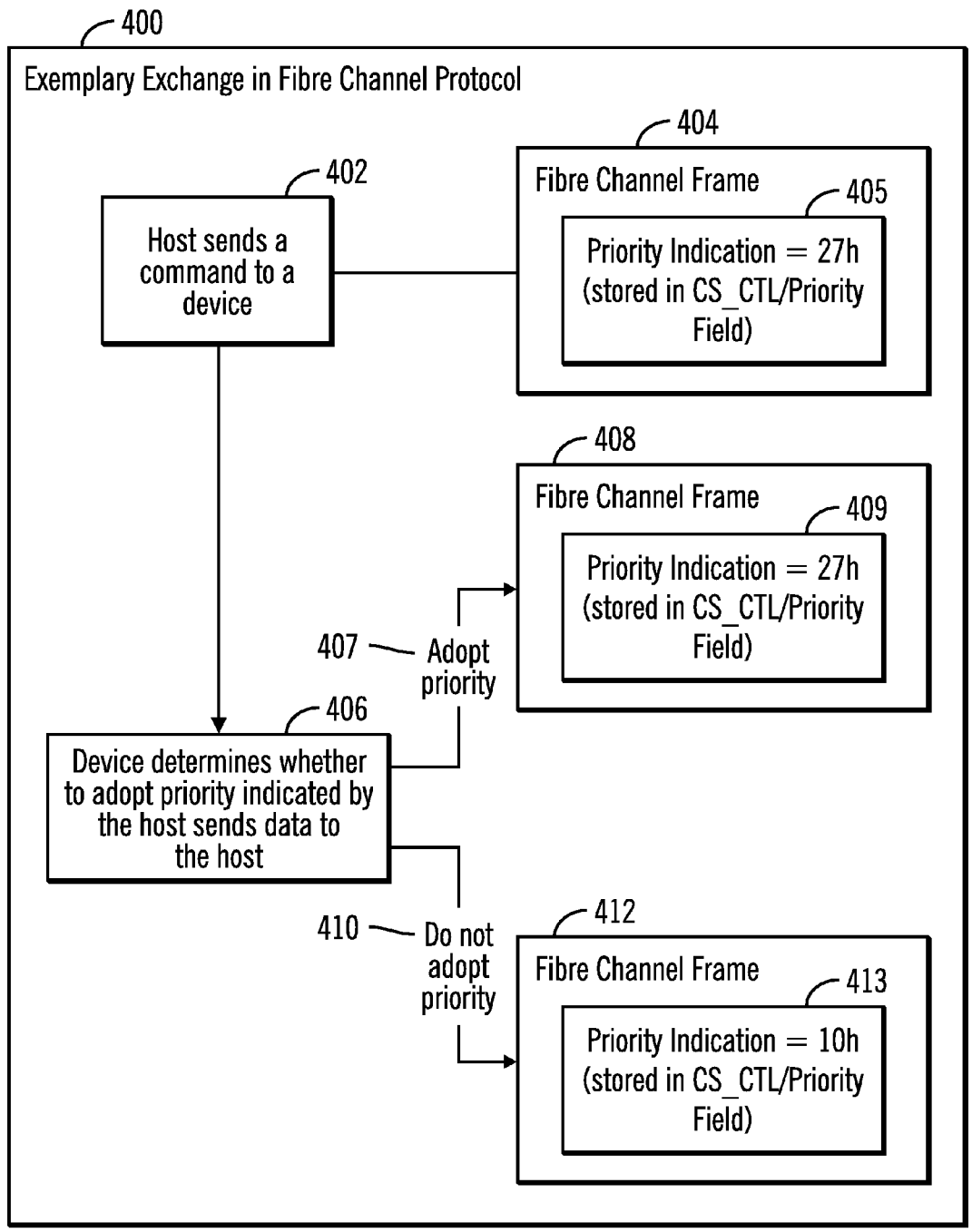
FIG. 4 illustrates a block diagram that shows an exemplary exchange in a Fibre Channel protocol, in accordance with certain embodiments.

FIG. 4 illustrates a block diagram 400 that shows an exemplary exchange in a Fibre Channel protocol, in accordance with certain embodiments. A host sends a command to a device (at block 402) where the command is sent via Fibre Channel frame(s) 404 that include the priority indication of 27 h (reference numeral 405). The device in response determines whether or not to adopt the priority indicated by the host (at block 406).

If the device determines to adopt the priority indicated by the host data to the host (branch 407), then data is sent via Fibre Channel frame(s) 408 that include the priority indication of 27 h (reference numeral 409), i.e., the priority indication in the response of the device is the same as the priority indication in the command from the host.

If the device determines not to adopt the priority indicated by the host (branch 410) [e.g., in a situation in which an asynchronous exchange with a different priority indication of 10 h had already been initiated by the device], then the data is sent via Fibre Channel frame(s) 412 that include a priority indication of 10 h (reference numeral 413), i.e., the priority indication in the response of the device is different from the priority indication in the command from the host.

FIG. 5 illustrates rules for device-level functions in command mode and transport mode in Fibre Channel, in accordance with certain embodiments.

Fibre channel input/output (I/O) operations may have priority assigned to them by a workload managing entity. A priority value is included in all Fibre Channel frames associated with an I/O operation. For FICON (FC-SB-5) I/O operations, there are situations in which a channel may initiate a new I/O operation at the same time a control unit is initiating an exchange to the channel to present an asynchronous status. This is referred to as "ships passing". It is desirable to maintain proper priority in subsequent frames of the exchanges to maintain order of the frames received by the channel as the ships passing scenario is resolved, based on the type of status being presented by the control unit and the rules of the Fibre Channel standards for resolving the condition. The rules for resolution of ships passing conditions are currently described in the FC-SB-5 standard and relevant ones are included here for reference (from FC-SB-5 rev 2.0, Mar. 25, 2013.) and shown in FIG. 5 via reference numeral 500.

The block shown via reference numeral 502 shows the rules for Device-level Functions in Command Mode in which if a channel sends an initiation information unit (IU) containing a device-level control function or a command to a device on a logical path and simultaneously a control unit sends an initiation IU as information category unsolicited data containing status for the same device on the same logical path, then the control unit shall send a response to the initiation IU using the existing inbound exchange with an IU which contains the same token, as the initiation IU from the channel. The channel shall discard the initiation IU from the control unit and shall wait for another IU on the inbound exchange from the same device which contains a response to its initiation IU.

This indicates that a control unit that opens a new exchange for the presentation of asynchronous status uses the same exchange to respond to a command that was simultaneously sent by the channel. The asynchronous status and the response to the command need to have the same priority so that they are received by the channel in the same order they are sent by the control unit. Otherwise, device level protocol errors may occur The block shown via reference numeral 504 shows the rules for Device-level Functions in Transport mode and the rules as follows:

"8.2.3 Rules for Device-Level Functions in Transport Mode
e) If a channel sends a transport-command IU to a device on a logical path and simultaneously a control unit sends an initiation IU as information category unsolicited data containing status on another exchange for the same device on the same logical path, then the following actions shall be performed in the order listed by the channel and control unit:
A) The channel shall respond to the initiation IU from the control unit with a stack status control IU on a new outbound exchange;
B) If the transport-command IU is for a write operation and first-transfer-ready is disabled, the channel shall send a transport-data IU to the control unit;
C) At this point, sequence initiative for the transport exchange is held by control unit and the channel waits for an IU from the CU sent in response to the command IU; and
D) The control unit shall respond to the stack status control IU with a DACK control IU on the existing inbound exchange and then shall either perform the transport operation specified by the transport-command IU from the channel or presents the stacked status with busy status in the transport-response IU on the transport exchange."

The cases that may need to be considered for implementation of the above rules are as follows:
(1) A Control IU sent by the channel simultaneous with asynchronous status sent by the control unit;
(2) A Control IU sent by the channel simultaneous with reconnection status sent by the control unit.

(3) A new Command IU sent by the channel simultaneous with asynchronous status sent by the control unit.

(4) A chained command sent in response to reconnection status sent by the control unit.

(5) A new Transport command sent by the channel simultaneous with the asynchronous status sent by the control unit.

The common rule that provides for constant priority an all frames of a given exchange is the following: If the control unit sends a status IU which opens an inbound exchange that is not in direct response to an IU from the channel, the priority value used for the status IU is model-dependent. The priority value used by the control unit in this exchange shall also be used in all subsequent IUs sent on that inbound exchange.

A side effect of this rule is that the outbound exchange may carry a different priority Y than the inbound exchange X. This may occur when a control unit sends asynchronous status for which chaining is not allowed. For control units which save the priority value from a disconnected operation and use it for any reconnection status, the priorities X and Y may be be the same.

Figure 6:
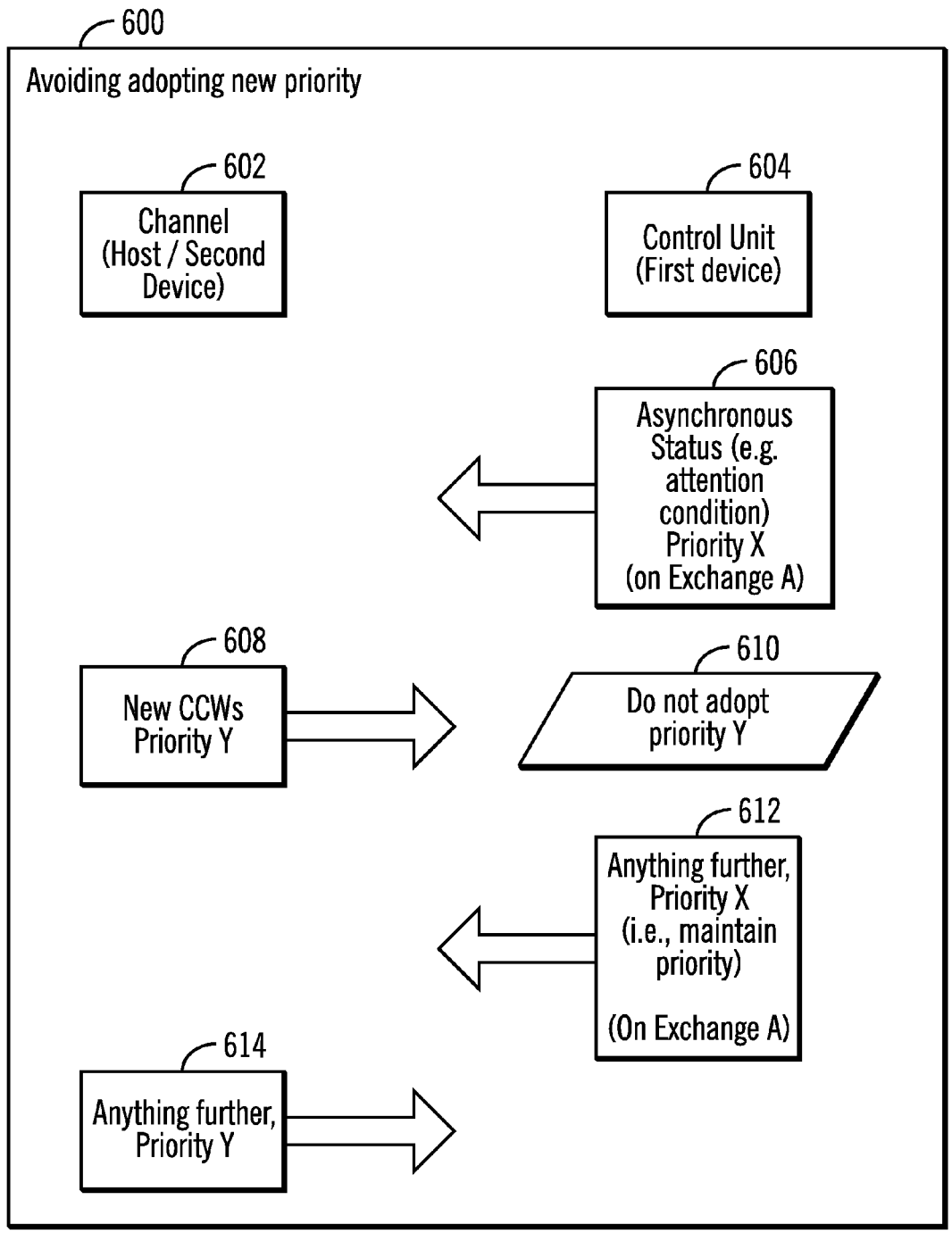
FIG. 6 illustrates a block diagram that shows priority indicated by a channel not being adopted by a control unit, in accordance with certain embodiments.

FIG. 6 illustrates a block diagram 600 that shows priority indicated by a channel 602 not being adopted by a control unit 604, in accordance with certain embodiments.

The control unit 604 may have started an exchange A in which data is sent asynchronously at a priority X, as shown via reference numeral 606. Subsequently, the channel 602 sends a channel control word (CCW) indicating a priority of Y (as shown via reference numeral 608).

If the control unit 604 were to adopt the priority Y indicated by the channel 602, then out of order frames may occur in the same exchange as data was being sent asynchronously with priority X. Therefore, the control unit 604 does not adopt the priority Y (shown via reference numeral 610) and continues to send any further Fibre Channel frames with priority X (shown via reference numeral 612). The channel 602 may of course send additional Fibre Channel frames with priority Y (shown via reference numeral 614).

Therefore, FIG. 6 illustrates certain embodiments in which the control unit 604 does not adopt the priority indicated by the channel 602, when an exchange with an asynchronous status is continuing. The exchange with an asynchronous status may relate to an attention condition.

Figure 7:
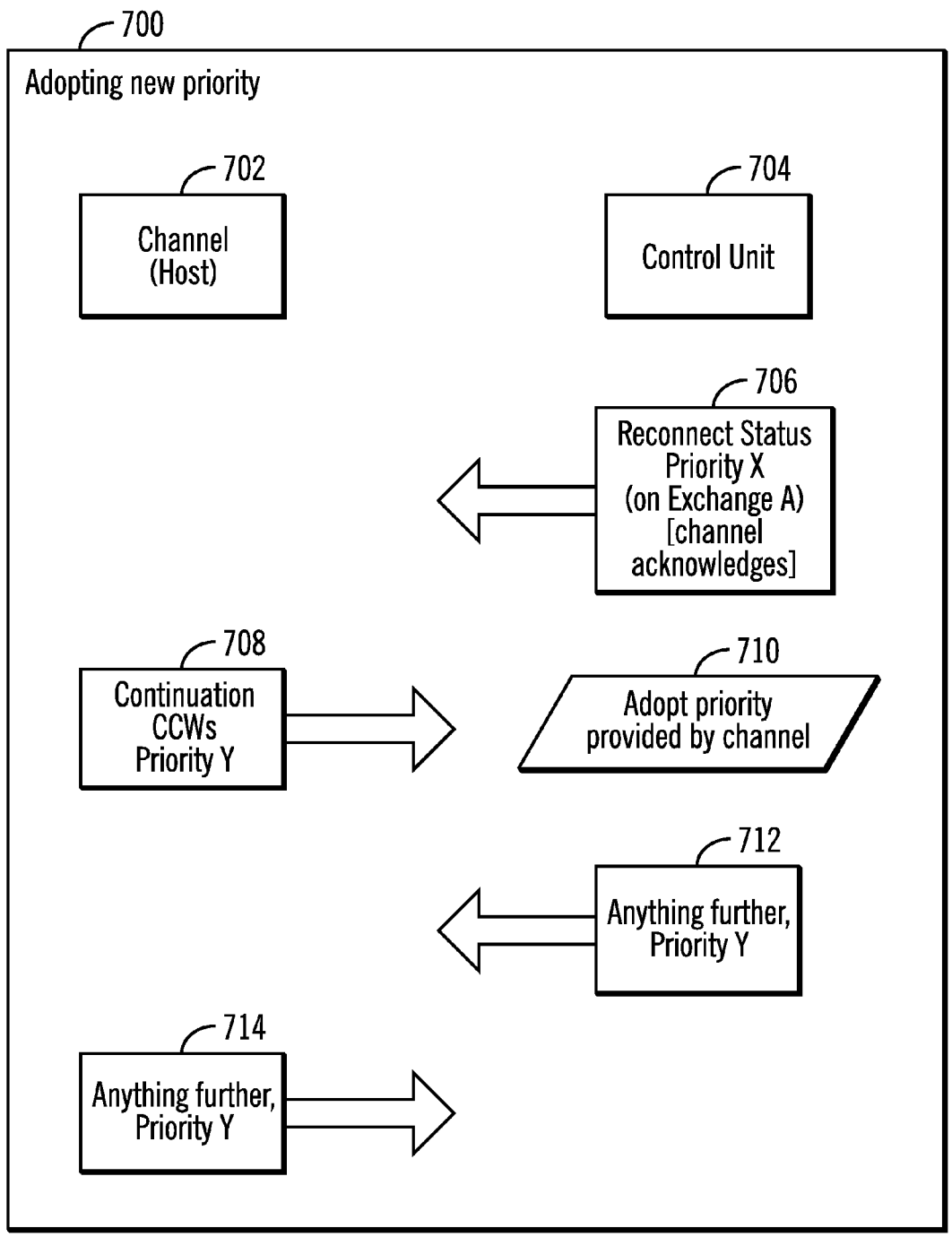
FIG. 7 illustrates a block diagram that shows priority indicated by a channel being adopted by a control unit, in accordance with certain embodiments.

FIG. 7 illustrates a block diagram 700 that shows priority indicated by a channel 702 being adopted by a control unit 704, in accordance with certain embodiments.

The control unit 704 may have started an exchange A in which data associated with a reconnect status is sent at a priority X, as shown via reference numeral 706. The channel acknowledgement of the reconnect status is received by the control unit 702. Subsequently, the channel 702 sends a continuation channel control word (CCW) indicating a priority of Y (as shown via reference numeral 708).

In such embodiments, the control unit 704 may safely adopt the priority Y indicated by the channel 702, as the acknowledgement of the reconnect status has already been received from the channel 702, and out of order frames cannot occur if the priority Y is adopted by the control unit 702. Therefore, the control unit 704 adopts the priority Y (shown via reference numeral 710) and continues to send any further Fibre Channel frames with priority Y (shown via reference numeral 712). The channel 702 may of course send additional Fibre Channel frames with priority Y (shown via reference numeral 714).

Therefore, FIG. 7 illustrates certain embodiments in which the control unit 604 adopts the priority indicated by the channel 702, when an exchange with a reconnect status has occurred.

Figure 8:
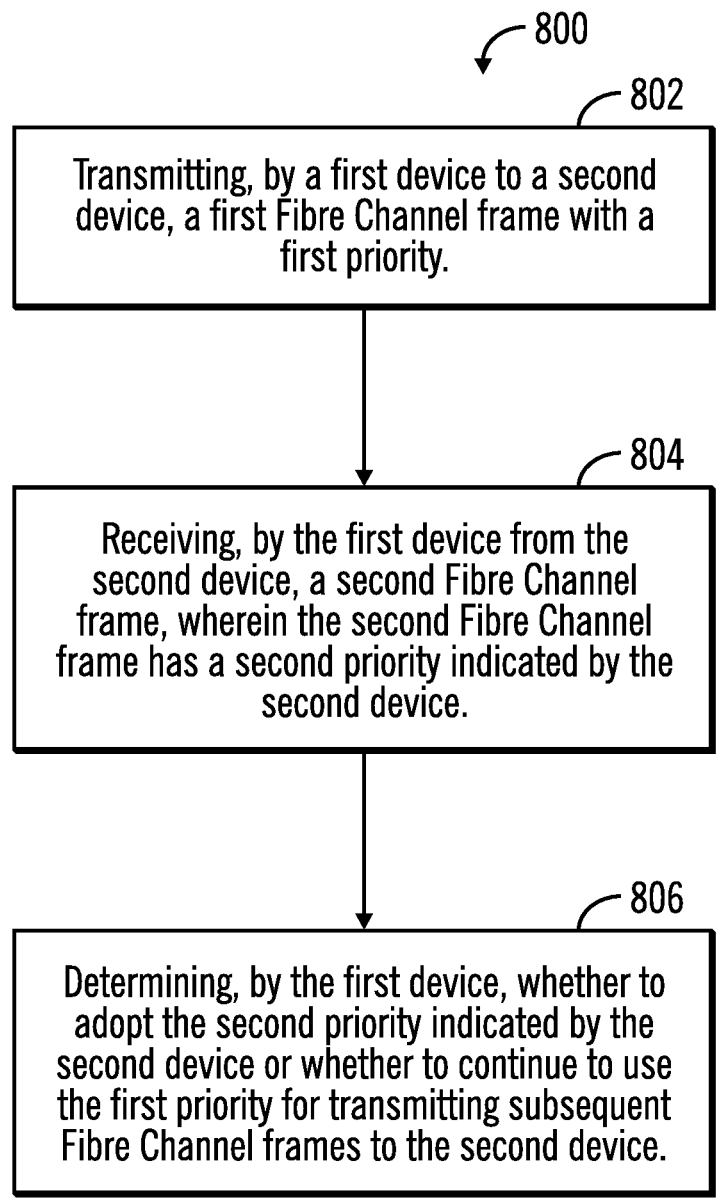
FIG. 8 illustrates a flowchart that shows operations performed for adopting or maintaining priority, in accordance with certain embodiments.

FIG. 8 illustrates a flowchart 800 that shows operations performed for adopting or maintaining priority, in accordance with certain embodiments. The operations shown in FIG. 8 may be performed by a device such as a control unit (e.g., a storage controller 102), where the device is referred to as a first device.

Control starts at block 802, in which a first device 102 (e.g., a storage controller) transmits a first Fibre Channel frame with a first priority to a second device 104 (e.g., a host). The first device 102 receives (at block 804) a second Fibre Channel frame from the second device 104, where the second Fibre Channel frame has a second priority indicated by the second device 104. The first device 102 determines (at block 806) whether to adopt the second priority indicated by the second device 104 or whether to continue to use the first priority for transmitting subsequent Fibre Channel frames to the second device 104.

In certain embodiments, if the first Fibre Channel frame indicates an asynchronous status (as shown in FIG. 6, reference numeral 606) then the first device 102 continues to use the first priority for transmitting the subsequent Fibre Channel frames to the second device 104.

In further embodiments, if the first Fibre Channel frame indicates a reconnect status (as shown in FIG. 7, reference numeral 706) then the first device 102 adopts the second priority indicated by the second device 104 for transmitting the subsequent Fibre Channel frames to the second device 104.

In certain embodiments, the first device is a control unit, and the second device is a channel. The control unit sends a command mode status which opens an inbound exchange with the first priority set in frames of an Information Unit (IU). In response to receiving a command mode IU that opens an outbound exchange with a synchronize response (SYR) bit set (as per FC-SB-5), wherein the outbound exchange has the second priority set in the frames of the IU, the control unit uses the second priority in frames of subsequent IUs of the inbound exchange. In additional embodiments, the SYR bit is set by the channel to indicate a direct response to the command mode status. As per FC-SB-5 section 8.7.2.6, Synchronize Response (SYR) is described as follows: "The SYR flag, bit 5, when set to one, shall indicate to the control unit that the command IU contains a command being sent in response to status received for the immediately preceding command. The channel may set the SYR bit to one only when the CH bit is set to one and the DU bit is set to zero in the command header."

In certain embodiments, the first device is a control unit, and the second device is a channel. The control unit sends a command mode status which opens an inbound exchange with the first priority set in frames of an Information Unit (IU). In response to receiving a command mode IU that opens an outbound exchange with a SYR bit not set, wherein the outbound exchange has the second priority set in the frames of the IU, the control unit continues to use the first priority in frames of subsequent IUs of the inbound exchange.

Therefore, FIGS. 1-8 illustrate certain embodiments, in which based on certain conditions, a first device determines whether to adopt a priority indicated by a second device or whether to continue to use an existing priority previously in use by the first device, for transmitting subsequent Fibre Channel frames to the second device.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
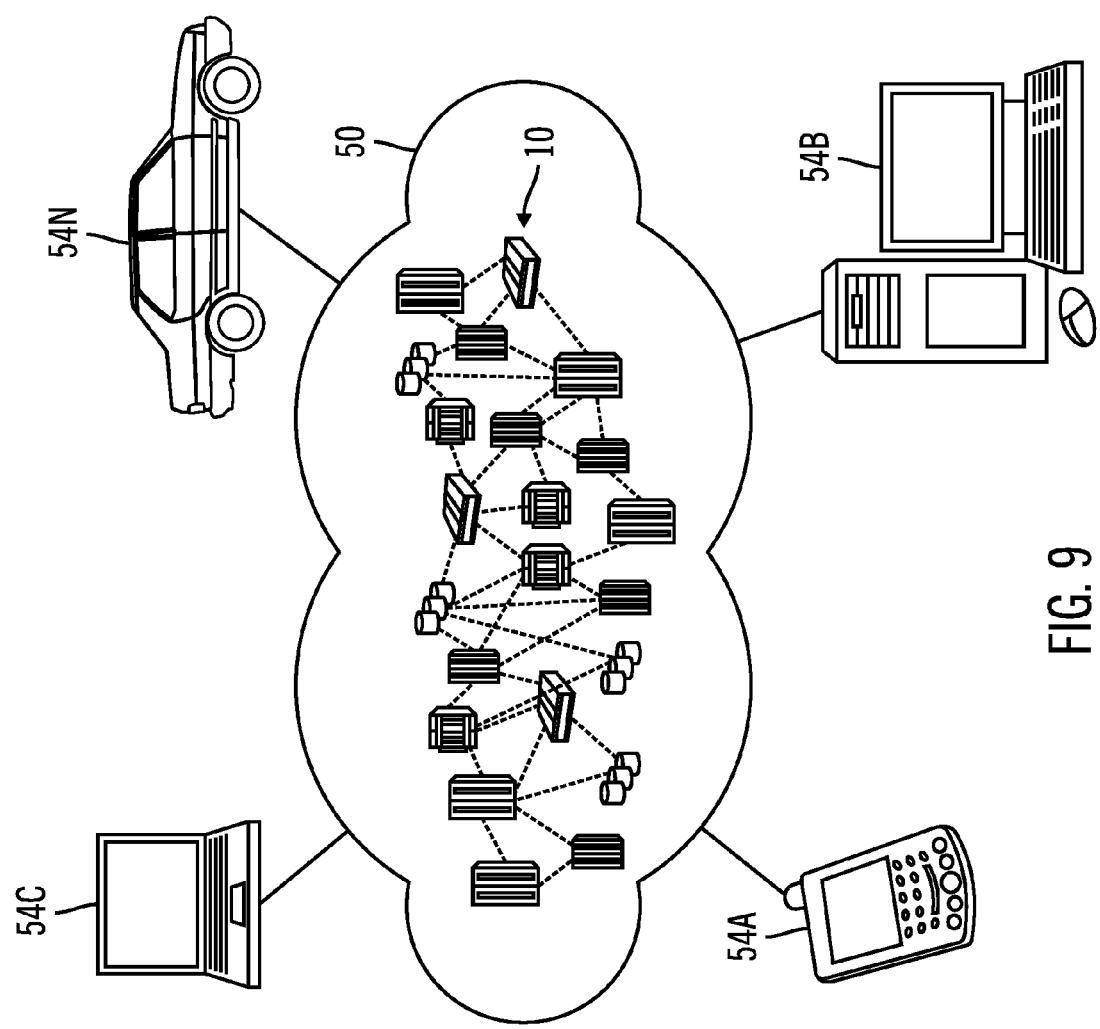
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
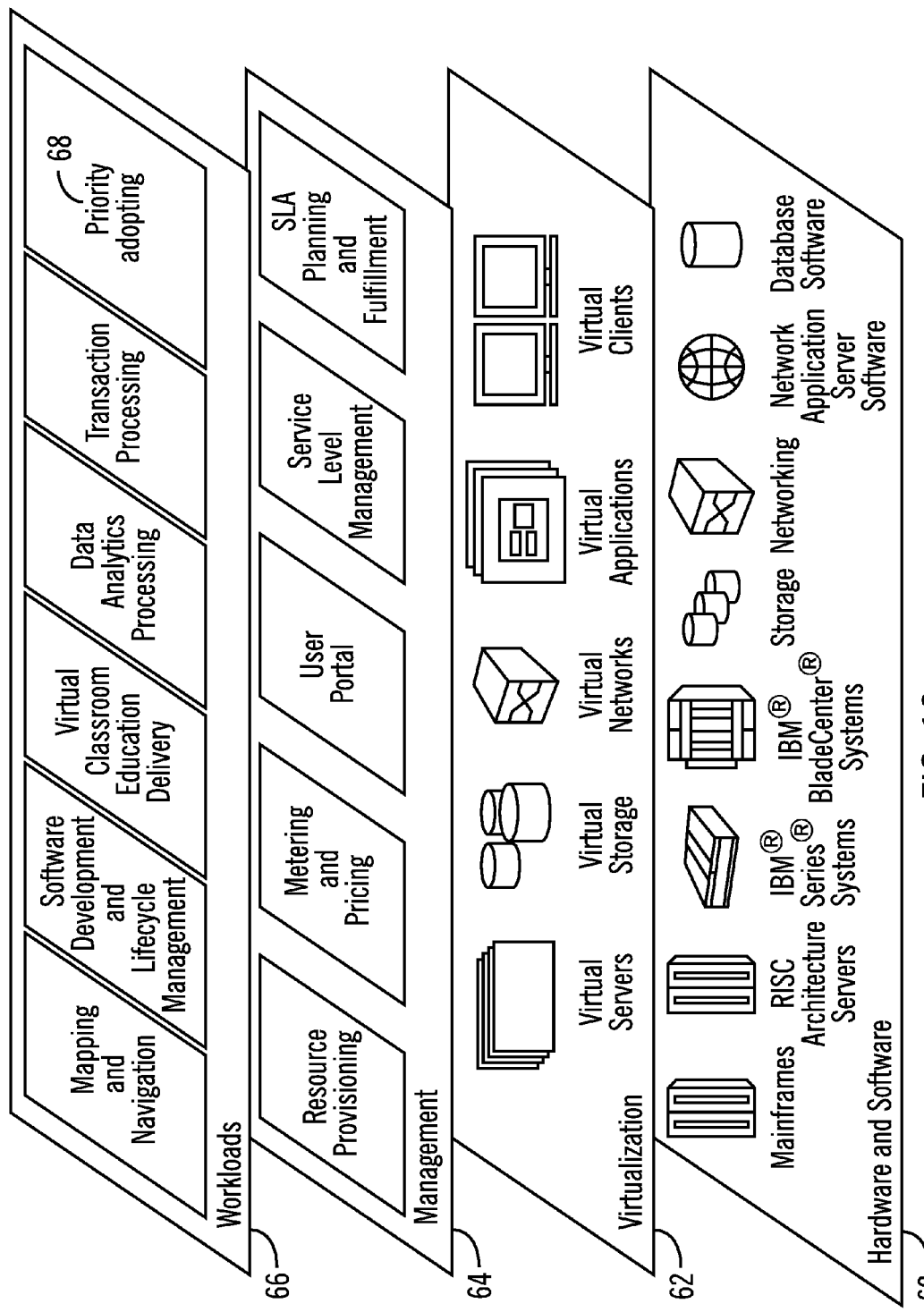
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the priority adopting mechanism 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
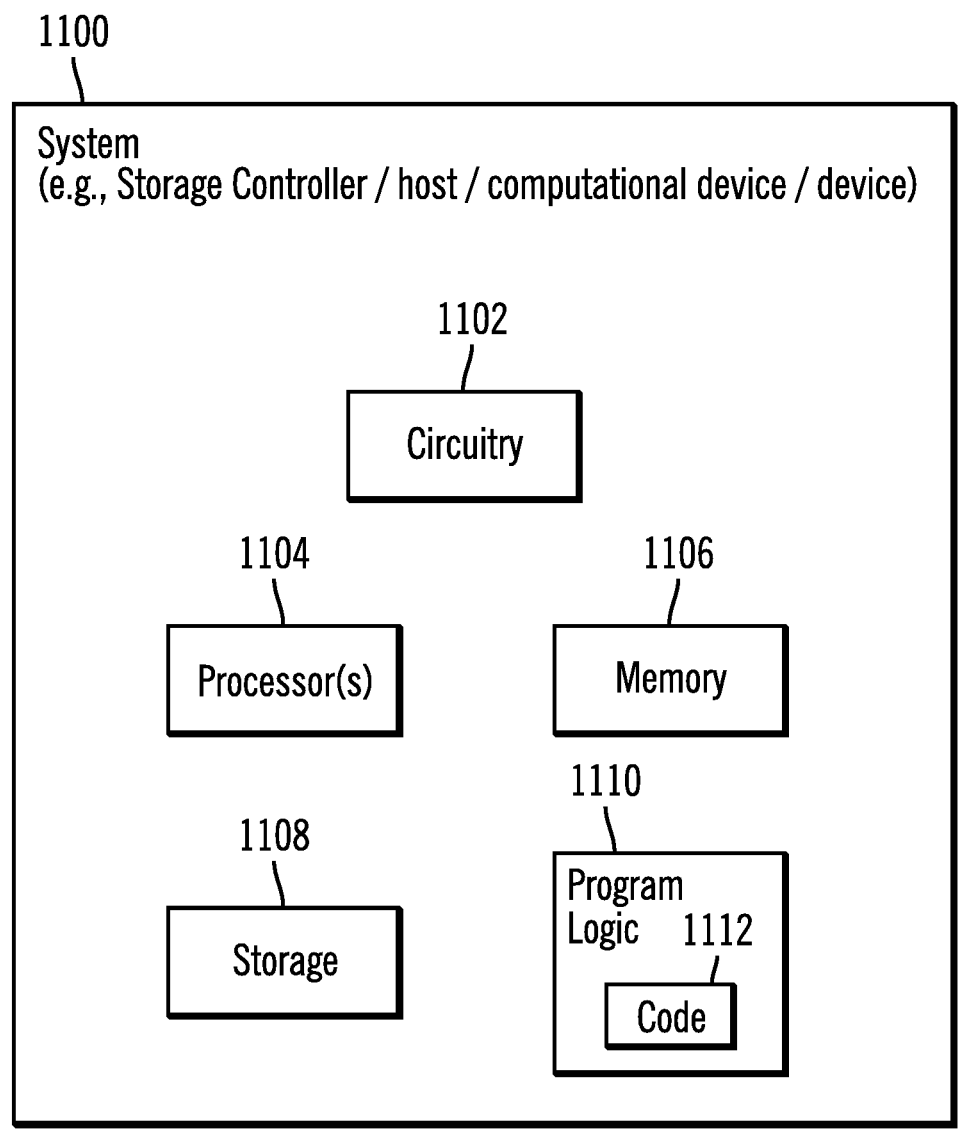
FIG. 11 illustrates a block diagram of a computational system that shows certain elements that may be included in the storage controller or the host shown in FIG. 1, in accordance with certain embodiments.

FIG. 11 illustrates a block diagram that shows certain elements that may be included in the host 114 or storage controller 112 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   transmitting, by a first device to a second device, a first Fibre Channel frame with a first priority;
   receiving, by the first device from the second device, a second Fibre Channel frame, wherein the second Fibre Channel frame has a second priority indicated by the second device; and
   determining, by the first device, whether to adopt the second priority indicated by the second device or whether to continue to use the first priority for transmitting subsequent Fibre Channel frames to the second device, wherein if the first Fibre Channel frame indicates an asynchronous status then the first device continues to use the first priority for transmitting the subsequent Fibre Channel frames to the second device.

2. The method of claim 1, wherein if the first Fibre Channel frame indicates a reconnect status then the first device adopts the second priority indicated by the second device for transmitting the subsequent Fibre Channel frames to the second device.

3. The method of claim 1, wherein the first device is a control unit, and the second device is a channel, the method further comprising:
   sending, via the control unit, a command mode status which opens an inbound exchange with the first priority set in frames of an Information Unit (IU); and
   in response to receiving a command mode IU that opens an outbound exchange with a SYR bit set, wherein the outbound exchange has the second priority set in the frames of the IU, the control unit uses the second priority in frames of subsequent IUs of the inbound exchange.

4. The method of claim 3, wherein the SYR bit is set by the channel to indicate a direct response to the command mode status.

5. The method of claim 1, wherein the first device is a control unit, and the second device is a channel, the method further comprising:
   sending, via the control unit, a command mode status which opens an inbound exchange with the first priority set in frames of an Information Unit (IU); and
   in response to receiving a command mode IU that opens an outbound exchange with a SYR bit not set, wherein the outbound exchange has the second priority set in the frames of the IU, the control unit continues to use the first priority in frames of subsequent IUs of the inbound exchange.

6. A method, comprising:
   transmitting, by a storage controller to a host, a first Fibre Channel frame with a first priority;
   receiving, by the storage controller from the host, a second Fibre Channel frame, wherein the second Fibre Channel frame has a second priority indicated by the host; and
   determining, by the storage controller, whether to adopt the second priority indicated by the host or whether to continue to use the first priority for transmitting subsequent Fibre Channel frames to the host, wherein:
   the storage controller controls a plurality of storage devices;
   a fabric comprising one or more Fibre Channel switches couples the storage controller to the host; and
   priority is indicated by programming a CS_CTL/Priority field in a frame header corresponding to Fibre Channel frames.

7. A system comprising first device, wherein the first device is coupled to a second device, the system comprising:
   a memory; and
   a processor coupled to the memory, wherein the processor performs operations, the operations comprising:
      transmitting, by the first device to the second device, a first Fibre Channel frame with a first priority;
      receiving, by the first device from the second device, a second Fibre Channel frame, wherein the second Fibre Channel frame has a second priority indicated by the second device; and determining, by the first device, whether to adopt the second priority indicated by the second device or whether to continue to use the first priority for transmitting subsequent Fibre Channel frames to the second device, wherein if the first Fibre Channel frame indicates an asynchronous status then the first device continues to use the first priority for transmitting the subsequent Fibre Channel frames to the second device.

8. The system of claim 7, wherein if the first Fibre Channel frame indicates a reconnect status then the first device adopts the second priority indicated by the second device for transmitting the subsequent Fibre Channel frames to the second device.

9. The system of claim 7, wherein the first device is a control unit, and the second device is a channel, the operations further comprising:
  sending, via the control unit, a command mode status which opens an inbound exchange with the first priority set in frames of an Information Unit (IU); and
  in response to receiving a command mode IU that opens an outbound exchange with a SYR bit set, wherein the outbound exchange has the second priority set in the frames of the IU, the control unit uses the second priority in frames of subsequent IUs of the inbound exchange.

10. The system of claim 9, wherein the SYR bit is set by the channel to indicate a direct response to the command mode status.

11. The system of claim 7, wherein the first device is a control unit, and the second device is a channel, the operations further comprising:
  sending, via the control unit, a command mode status which opens an inbound exchange with the first priority set in frames of an Information Unit (IU); and
  in response to receiving a command mode IU that opens an outbound exchange with a SYR bit not set, wherein the outbound exchange has the second priority set in the frames of the IU, the control unit continues to use the first priority in frames of subsequent IUs of the inbound exchange.

12. A system comprising a storage controller, wherein the storage controller is coupled to a host, the system comprising:
  a memory; and
  a processor coupled to the memory, wherein the processor performs operations, the operations comprising:
    transmitting, by the storage controller to the host, a first Fibre Channel frame with a first priority;
    receiving, by the storage controller from the host, a second Fibre Channel frame, wherein the second Fibre Channel frame has a second priority indicated by the host; and
    determining, by the storage controller, whether to adopt the second priority indicated by the host or whether to continue to use the first priority for transmitting subsequent Fibre Channel frames to the host, wherein:
      the storage controller controls a plurality of storage devices;
      a fabric comprising one or more Fibre Channel switches couples the storage controller to the host; and
      priority is indicated by programming a CS_CTL/Priority field in a frame header corresponding to Fibre Channel frames.

13. A computer program product, the computer program product comprising a computer readable storage medium having computer readable program code embodied therewith, the computer readable program code configured to perform operations on a processor, the operations comprising:
  transmitting, by a first device to a second device, a first Fibre Channel frame with a first priority;
  receiving, by the first device from the second device, a second Fibre Channel frame, wherein the second Fibre Channel frame has a second priority indicated by the second device; and
  determining, by the first device, whether to adopt the second priority indicated by the second device or whether to continue to use the first priority for transmitting subsequent Fibre Channel frames to the second device, wherein if the first Fibre Channel frame indicates an asynchronous status then the first device continues to use the first priority for transmitting the subsequent Fibre Channel frames to the second device.

14. The computer program product of claim 13, wherein if the first Fibre Channel frame indicates a reconnect status then the first device adopts the second priority indicated by the second device for transmitting the subsequent Fibre Channel frames to the second device.

15. The computer program product of claim 13, wherein the first device is a control unit, and the second device is a channel, the operations further comprising:
  sending, via the control unit, a command mode status which opens an inbound exchange with the first priority set in frames of an Information Unit (IU); and
  in response to receiving a command mode IU that opens an outbound exchange with a SYR bit set, wherein the outbound exchange has the second priority set in the frames of the IU, the control unit uses the second priority in frames of subsequent IUs of the inbound exchange.

16. The computer program product of claim 15, wherein the SYR bit is set by the channel to indicate a direct response to the command mode status.

17. The computer program product of claim 13, wherein the first device is a control unit, and the second device is a channel, the operations further comprising:
  sending, via the control unit, a command mode status which opens an inbound exchange with the first priority set in frames of an Information Unit (IU); and
  in response to receiving a command mode IU that opens an outbound exchange with a SYR bit not set, wherein the outbound exchange has the second priority set in the frames of the IU, the control unit continues to use the first priority in frames of subsequent IUs of the inbound exchange.

18. A computer program product, the computer program product comprising a computer readable storage medium having computer readable program code embodied therewith, the computer readable program code configured to perform operations on a processor, the operations comprising:
  transmitting, by a storage controller to a host, a first Fibre Channel frame with a first priority;
  receiving, by the storage controller from the host, a second Fibre Channel frame, wherein the second Fibre Channel frame has a second priority indicated by the host; and
  determining, by the storage controller, whether to adopt the second priority indicated by the host or whether to continue to use the first priority for transmitting subsequent Fibre Channel frames to the host, wherein:

the storage controller controls a plurality of storage devices;

a fabric comprising one or more Fibre Channel switches couples the storage controller to the host; and priority is indicated by programming a CS_CTL/Priority field in a frame header corresponding to Fibre Channel frames.

* * * * *